United States Patent [19]

Rode et al.

[11] 4,348,665

[45] Sep. 7, 1982

[54] METHOD AND APPARATUS FOR MONITORING BEARING WEAR

[75] Inventors: Heinz A. Rode, Solon; Meter Fromel, Austintown; Perry L. Beaver, Vienna, all of Ohio

[73] Assignee: Republic Steel Corporation, Cleveland, Ohio

[21] Appl. No.: 127,580

[22] Filed: Mar. 6, 1980

[51] Int. Cl.³ .............................................. G08B 21/00
[52] U.S. Cl. ................................... 340/682; 164/153; 308/1 A; 340/686
[58] Field of Search ............... 340/682, 686; 308/1 A; 164/153, DIG. 2

[56] References Cited

U.S. PATENT DOCUMENTS

| | | | |
|---|---|---|---|
| 2,718,148 | 9/1955 | Knudsen | 340/682 |
| 2,780,709 | 2/1957 | Thompson et al. | 340/682 |
| 2,805,677 | 9/1957 | Baird | 340/682 |
| 3,155,956 | 11/1964 | Hornbostel et al. | 340/682 |
| 3,176,286 | 3/1965 | Dschen | 340/682 |
| 3,678,493 | 7/1972 | Shuey | 340/682 |
| 3,824,579 | 7/1974 | Waseleski et al. | 340/682 |
| 3,981,621 | 9/1976 | Considine | 340/682 |
| 4,092,053 | 5/1978 | Riegler et al. | 340/682 |
| 4,107,603 | 8/1978 | Slough | 340/682 |

*Primary Examiner*—Glen R. Swann, III
*Attorney, Agent, or Firm*—Watts, Hoffmann, Fisher, & Heinke Co.

[57] ABSTRACT

Apparatus and method are disclosed for monitoring the condition of a basic oxygen furnace (BOF) trunnion bearing. A shaft attached to a basic oxygen furnace (BOF) vessel is supported on either vessel side by a radial bearing which allows rotation of the shaft with respect to those bearings. One of the radial bearings is in turn mounted to a ladder bearing which allows shaft expansion and contraction with temperature. A Hall Effect transducer is mounted on both bearing sides to monitor the distance between the shaft and the transducer. If an output from the transducer deviates from a predetermined range the shaft position has shifted. This shift is an indication that either the radial or ladder bearing has or may in the near future fail. The apparatus therefore provides a warning that either replacement or repair of the BOF vessel trunnion bearing may be required.

5 Claims, 10 Drawing Figures

METHOD AND APPARATUS FOR MONITORING BEARING WEAR

BACKGROUND OF THE INVENTION

1. Field of the Invention

This invention relates generally to an apparatus for sensing the condition of a bearing and in particular to a transducer sensor for monitoring the condition of a trunnion bearing which supports a basic oxygen furnace vessel.

Prior Art

Bearing mounted rotatable shafts have utility in a variety of heavy equipment operations. During normal operation, such a rotatable shaft should rotate about a relatively stationary axis. Continued operation of heavy equipment can cause the bearing to wear and ultimately fail. The damage caused by such failure can be severe especially when the shaft and bearing are massive.

Many operations in the steel making process require large and massive shafts which rotatably support a steel or iron containing vessel. For example, a basic oxygen furnace (BOF) used in steel making includes a vessel into which scrap iron is placed and molten iron is poured for decarbonization by oxidation. When a particular quality of steel is achieved through oxidation of carbon and the addition of any desired constituent, the BOF vessel is tilted and steel is poured from the vessel into a ladle. The steel is subsequently poured from the ladle to form ingots of steel.

The BOF vessel is in essence a very large vat which is mounted for rotation on a pair of shafts. The weight of a typical empty vat is 150 tons and when filled with a charge (molten iron) such a vat plus charge will typically exceed 400 tons in weight.

A typical vessel is mounted for rotation on a pair of trunnion bearings which allow the BOF vessel to be rotated 360 degrees about a horizontal axis. When an appropriate carbon concentration in the molten metal is reached the BOF vessel is rotated approximately 180° so that the molten steel can be poured into one or more ladles. The vessel is then returned to an upright position and the ladle removed from beneath the vessel. A certain amount of slag or waste remains in the bottom of the vessel. The vessel is therefore subsequently rotated 180° in an opposite direction to dump the slag into a second container which removes the slag from the BOF station.

As the BOF vessel is rotated under action of a motor, the trunnion bearings in which the vessel is mounted are subject to extreme environmental conditions. As noted above, the combined weight of the vessel and its charge is typically over 400 tons and therefore significant forces are transmitted to the trunnion bearings. The extreme temperature variations in the BOF vessel cause the vessel shaft to expand and contract and thereby impart a transverse force to the BOF bearing. Other adverse environmental conditions such as dust, dirt and water also contact the BOF trunnion bearing during the steel making process.

Due to the weight and thermal expansion forces transmitted from the shaft to the bearings, the trunnion bearings can fail. It is important that an impending failure is sensed before a catostrophic accident results. Should a trunnion bearing be allowed to fail, it is possible that at some time the whole vessel could be dislodged. If this should occur when a charge is located in the vessel, molten steel would pour unchecked upon the BOF site with loss of production and damage to that site. It is therefore imperative that the condition of the BOF trunnion bearings be monitored so that maintenance and/or replacement are instituted at the first sign of failure.

The prior art technique for monitoring trunnion bearing failure was to make a physical inspection of the two trunnion bearings of each BOF vessel every two years. During an inspection if a condition was found which would indicate that a failure might occur in a short period of time, the bearing would either be replaced or serviced.

This inspection every two years technique for monitoring trunnion bearing failure, however, is based upon the premise that the bearing failure is a slow process which will take at least two years to occur. This need not be the case. If the trunnion bearing failure occurs in less than two years the inspection every two year process will not be adequate.

The periodic inspection technique for locating failures is also inefficient. By inspecting every two years, considerable time and production is lost since in most instances no wear problems are observed. While it is clear that monitoring of a BOF trunnion bearing is a necessity it is also clear that known techniques for detecting imminent failure are excessively time consuming and inadequate.

SUMMARY OF THE INVENTION

The present invention overcomes the inefficiencies inherent in prior art bearing monitoring systems by providing an indication of the bearing condition by continuously monitoring the position of a shaft in relation to its bearing. The shaft defines an axis of rotation and under normal functioning this shaft axis remains stationary with respect to its bearing. Deviations from an allowable design range of shaft centerline to bearing distance indicate a failure in the bearing may be occurring and that the condition of the bearing should be checked. By monitoring the shaft position with relation to the bearing, superfluous checking of the bearing condition is no longer needed and potential problems can now be investigated as soon as a deviation occurs.

The apparatus embodied by the invention includes a sensor mounted to each bearing for discerning movement of a shaft in relation to the bearing. Circuitry is coupled to the sensor for providing an indication of the movement. The apparatus has utility when used in conjunction with a BOF vessel shaft or other rotatable shaft positioned in a bearing.

In one embodiment the sensor comprises a transducer for generating a voltage proportional to a gap distance between the shaft and the transducer. Circuitry is included for monitoring the voltage provided by the transducer and for initiating an alarm when the voltage deviates from a predetermined range. The predetermined range of acceptable voltage readings is empirically determined when the bearing is installed. If a voltage is generated which is larger or smaller than this predetermined range, it is an indication that the gap between the shaft and bearing has become either too small or too large and that a malfunction in the bearing either has occurred or may occur unless maintenance procedures are instituted.

In a preferred embodiment of the invention used in a BOF steel making facility, two transducers are mounted to both an idler and a drive shaft for a total of four transducers per BOF vessel. Utilization of two transducers produces a redundancy in the system in the event one transducer malfunctions. The transducers are Hall Effect transducers which produce a signal directly proportional to the distance between the shaft and the transducer. After passage through an amplifying circuit the signal from the Hall Effect transducers is sent to a meter which accurately indicates the shaft to bearing gap dimension. If this dimension deviates beyond the predetermined range analog circuitry is provided which causes an alarm signal to sound thereby apprising factory personel that a problem may exist.

Included with the system is a hard copy printer which allows direct monitoring of the transducer to shaft distance and thereby produce a permanent record for later reference. In order to produce a print-out of the transducer to shaft distance it is necessary that the analog signal from the transducer be converted to a digital output. This is accomplished in an analog to digital converter which comprises a portion of the control circuitry.

The particular production facility in which utilization of the invention is contemplated includes two BOF steel furnaces. Multiple transducers are included on the drive and idle side of both BOF furnaces and therefore it is necessary that logic circuitry be included for determining not only which BOF furnace has a potential malfunctioning trunnion bearing but which side of the furnace has moved thereby producing the warning signal. To accomplish this function the analog to digital converter is also attached to digital logic circuitry which controls the transmittal of information to the printer.

From the above, it is apparent that one object of the invention is to continuously monitor the positioning of a BOF vessel rational shaft in relation to a Hall Effect transducer mounted to the BOF trunnion bearing and thereby note changes in the condition of that trunnion bearing. A second failure of the invention is utilization of logic circuitry to determine which of a number of shaft positions has changed from an optimum valve and produce both visual and auditory warnings to the BOF user. Other features and objectives of the invention will become better understood when considered in conjunction with the accompanying drawings and their detailed description.

DETAILED DESCRIPTION

Figure 1:
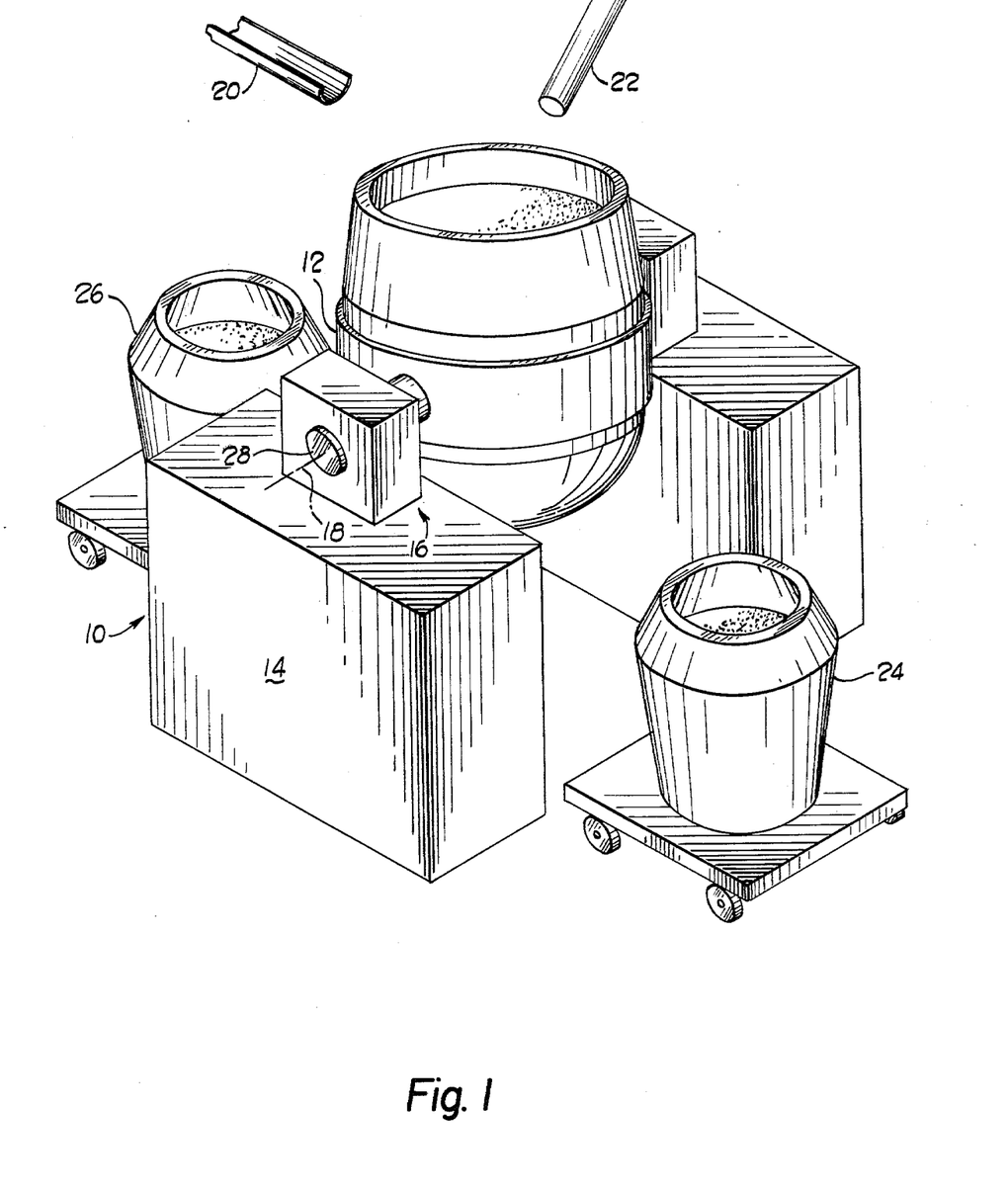
FIG. 1 schematically shows a BOF station including a vessel mounted on a trunnion.

Referring now to the drawings and FIG. 1 in particular, a basic oxygen furnace (BOF) station 10 is illustrated. At this station molten iron is converted to steel by a decarbonization process occurring within a BOF vessel 12. Once the proper carbon concentration has been achieved, the steel is poured from the vessel to a ladle 24 for removal from the BOF station.

The BOF station comprises the BOF vessel 12, a support 14 for the vessel, and a roller bearing enclosed in a housing 16 for rotatably mounting the vessel. Rotation of the BOF vessel about an axis 18 allows the vessel to be positioned in different orientations during the steel making process.

During a first step in the process molten iron is poured from a chute 20 to the vessel 12. The chute 20 is connected to a second vessel supported above the BOF station by a crane. Once the molten iron has been deposited in the BOF vessel 12 the vessel is rotated into a vertical position for decarbonization of the iron.

An oxygen lance 22 is lowered into the vessel to supply oxygen for the decarbonization process. The temperature of the molten iron is continually monitored as the decarbonization process continues until the temperature nears a range appropriate for the desired carbon concentration. Physical specimens of the molten material are then removed from the vessel and transmitted to a metallurgy lab for analysis. When the metallurgy lab confirms that the proper carbon concentration has been achieved, the oxygen lance 22 is removed from the vessel.

Rotation of the vessel about the axis 18 allows the molten steel to pour into the ladle 24. A certain amount of slag material remains in the vessel 12 after the steel has been poured and as seen in FIG. 1, counterclockwise rotation of the vessel 12 about the axis 18 causes the slag material to be poured into a second ladle 26.

The physical construction of the support 14 allows the two ladles 24, 26 to be positioned at appropriate receiving stations. The support 14 includes two walls which define an open region for receiving the ladles. The BOF vessel is attached to a shaft 28 pivotally mounted to the support on either side of this open region. In operation the ladle 24 is moved to a receiving station between the two walls and removed after the steel has been deposited from the vessel. The slag ladle 26 is then inserted into a second receiving station between the two walls for receiving its deposit of slag.

The shaft 28 is supported by two roller bearings on opposite sides of the open region. These bearings support weights of up to 400 tons as well as being subjected to extreme environmental conditions of heat, dirt, and water. Loading forces caused by the vessel and expension forces due to temperature variations cause the bearing to experience forces which ultimately can cause a failure in the bearing. To detect such a failure the position of the vessel shaft 28 in relation to the bearing is continuously monitored.

Figure 2:
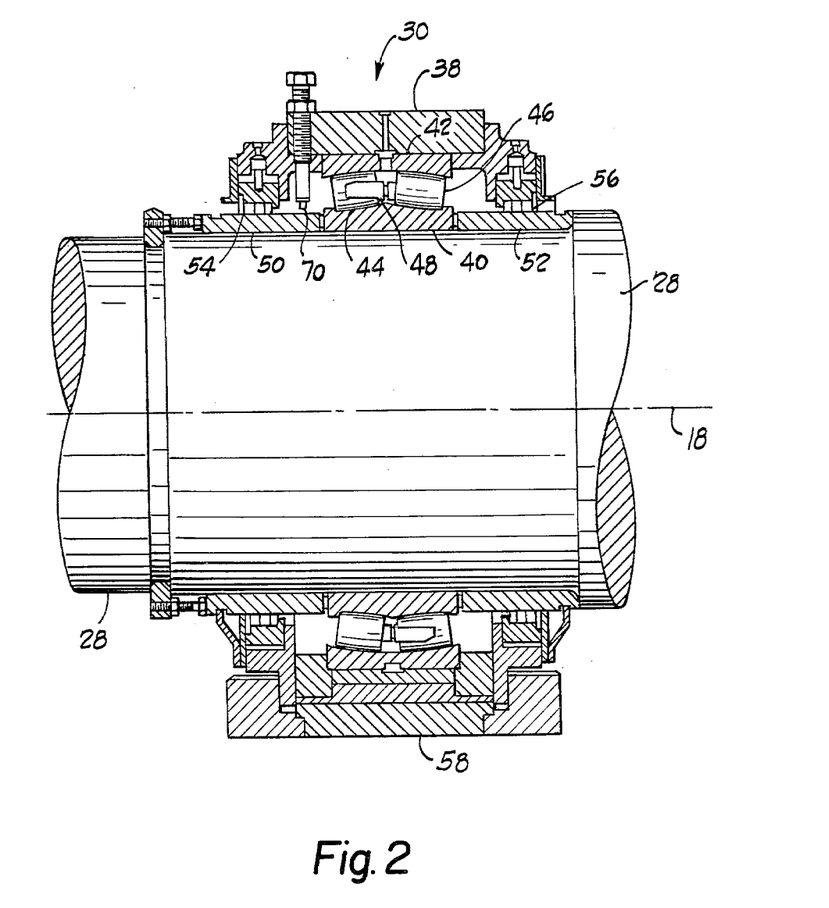
FIG. 2 shows a sectional view of a BOF vessel shaft mounted in a drive side roller bearing.
Figure 3:
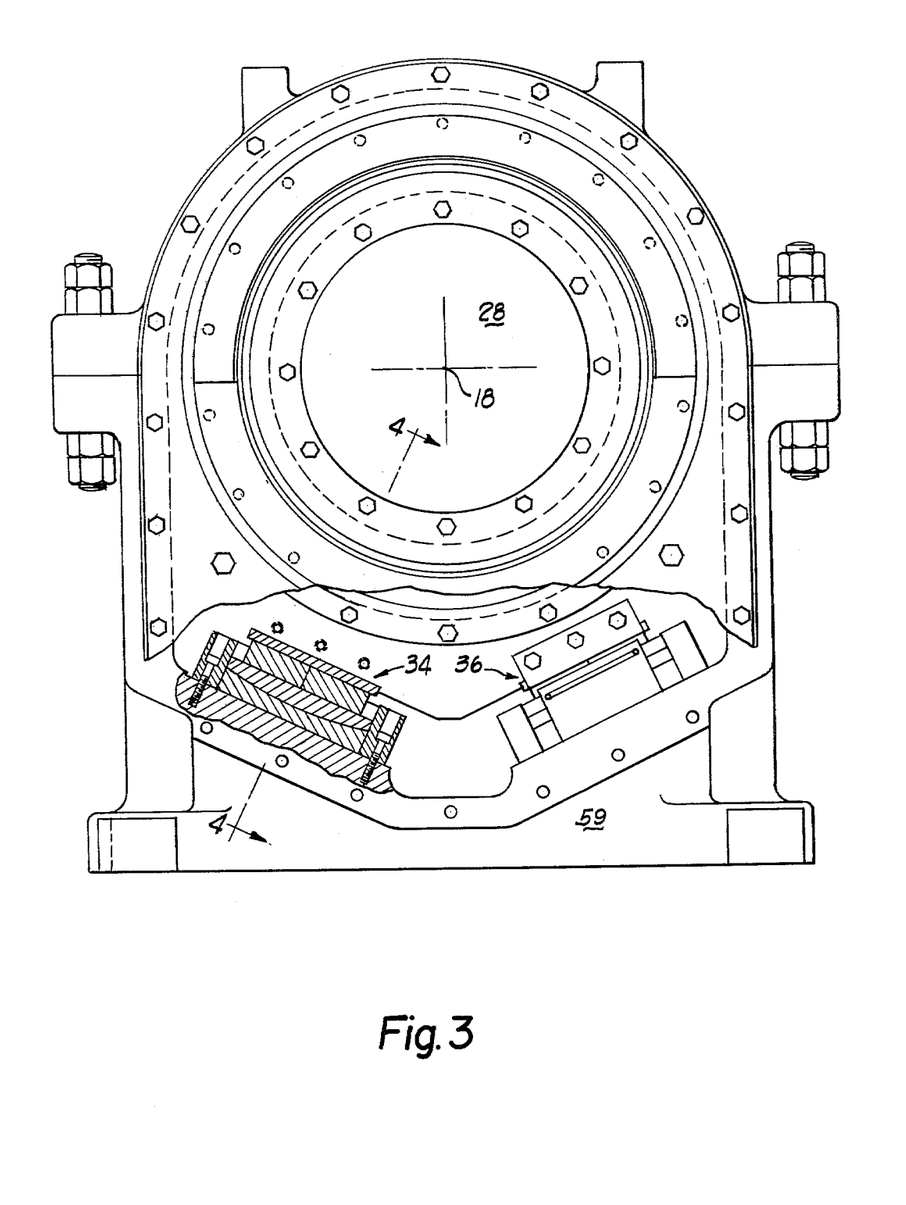
FIG. 3 shows a partially sectioned end view of an idle side roller bearing.
Figure 4:
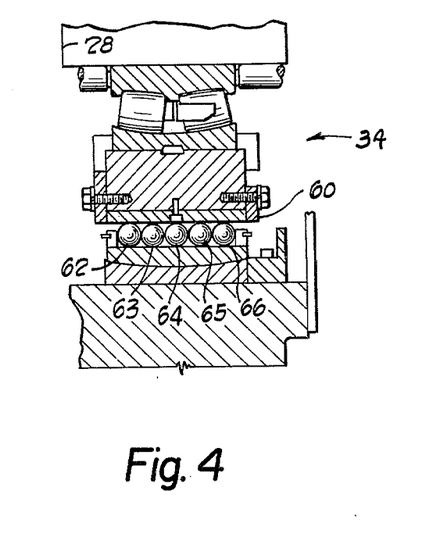
FIG. 4 shows a cross section of a ladder bearing used to support the idle side bearing shown in FIG. 3.

As seen in FIGS. 2-4 each bearing comprises two dual roller bearings 30, 32, which support the shaft 28. A drive side of the shaft is fixed in relation to the support 14 and is coupled to a suitable device mechanism such as a motor. An idle side of the shaft is mounted to a roller bearing 32 which in turn is mounted for translational motion on two ladder bearings 34, 36. As temperature variations cause contraction and expansion of the shaft the ladder bearings 34, 36 allow the idle side bearing to move in a transverse direction.

A sectional view of the drive side roller bearing is shown in FIG. 2. The bearing 30 is positioned in a bearing housing 38 and supports the shaft 28. The bearing comprises an inner 40 and outer 42 race and two rollers 44, 46 maintained in position by a cage 48. An inner 50 and outer 52 sleeve fixed to the shaft 28 position the bearing along the shaft. The housing 38 and sleeves 50, 52 contact along two annular seals 54, 56.

The drive side roller bearing is fixed in relation to the support 14 by a housing base 58. The idle side roller bearing is of similar construction to that shown in FIG. 2 but is supported by the two ladder bearings for transverse movement. These two ladder bearings are supported by a second base 59 which contacts the support 14.

A cross-sectional view of one of two ladder bearings 34 is illustrated in FIG. 4. The two ladder bearings support the idle side roller bearing for transverse movement along a direction parallel to the shaft. The idle side roller bearing includes a base 60 contacting five rollers 62-66. This mounting allows the base 60 to slide across the rollers in response to thermal expansion forces.

A failure in either the roller or ladder bearings will allow a shift in the shaft (and accompanying sleeves) in relation to the bearing housing 38. If the failure goes undetected a catastrophic failure in the bearing may allow the entire vessel 12 to become dislodged with accompanying loss of production and damage to the BOF station.

To monitor shifts in the position of the shaft 28, two position sensitive transducers are mounted to both the idle and drive side bearing housings. One such transducer 70 is shown (FIG. 2) mounted to the housing 38 in fixed relation to the shaft's inner sleeve 50. During normal BOF operation the distance between the transducer 70 and the sleeve 50 should remain within a range of acceptable values which have been empirically determined. If the distance between the transducer and sleeve deviates from this range of values it is a sign that a bearing (either ladder or roller) may have failed or may be about to fail. By monitoring the position between sleeve and transducer a warning of this condition can be transmitted to personnel at the BOF station and maintenance or inspection procedures instituted.

Figure 5:
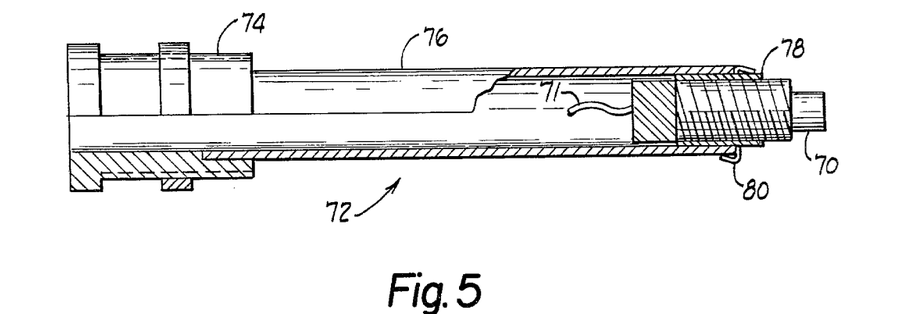
FIG. 5 shows a transducer mounted for position sensing the transducer to shaft distance.

A cross-section of a transducer mounting assembly 72 is shown in FIG. 5. The assembly maintains a transducer 70 in fixed relation with the bearing housing 38. The assembly comprises a threaded head 74 which coacts with a threaded aperture in the housing 38. A pipe 76 with threaded insert 78 is brazed to the head 74. The insert receives the transducer 70 which is positioned in relation to a shaft sleeve through adjustment of a locknut 80. The transducer is coupled to electrical circuitry for monitoring the sleeve to transducer distance by a lead 71.

Figure 6:
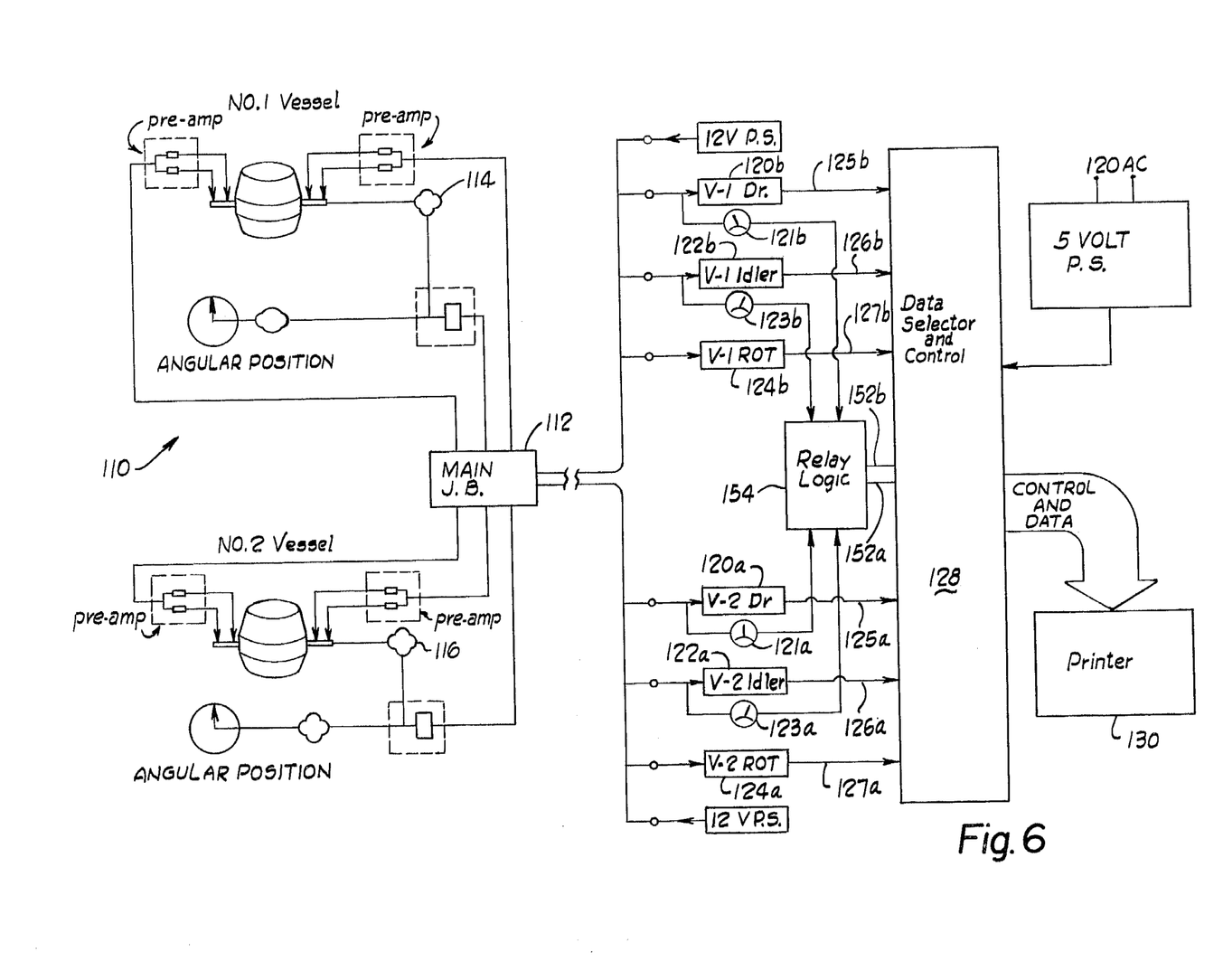
FIG. 6 is a schematic of a two station BOF facility and a system for sensing potential bearing failure in that facility.

One installation in which the present invention is advantageously utilized is a two vessel BOF station 110 which has been schematically illustrated in FIG. 6. Also illustrated schematically in FIG. 6 are logic and control circuits for receiving and interpreting signals from transducers mounted to the two vessel shafts.

The two vessel BOF station 110 has a redundant bearing failure detection capability. Two transducers are positioned on both the drive and idle side shafts of each BOF vessel. Should one transducer malfunction, the movement of the shaft relative to the sleeve is still detected by the second position sensitive transducer. The transducers are coupled through the lead 71 (see FIG. 5) to a pre-amp and then to a junction box 112. In the preferred embodiment the pre-amps are Electro Corporation Model 3670 proximity detector pre-amplifiers and the leads 71 comprise 366-P cable. The signal output from the pre-amps is directly proportional to the separation between the shaft sleeve 50 and the transducer 70 and varies from zero to ten volts which represents a sleeve to transducer distance of zero to one hundred thousandths of an inch.

The rotational position of each shaft is also continuously monitored by two Selsyn Units 114, 116. The Selsyn Units are positioned in close relation to the vessel shaft and transmit signals indicative of the rotational position of the shaft in relation to the vessel's true vertical position. A General Magnetics MAC1459-1 converter provides rotational position information in the preferred embodiment of the invention.

Signals indicative of the rotational and separation positions are transmitted through the junction box 112 to a plurality of meters 120-124 for indicating shaft orientation and position. Since the position of two BOF vessels are monitored in the preferred embodiment, separate meters are necessary for each vessel and letter designation (i.e. 120a, 120b) have been used to distinguish between the meters coupled to different vessels but which supply the same data regarding BOF vessel orientation and position.

Two position sensitive meters 120, 122 provide a digital readout of the gap dimension between a transducer and the shaft sleeve for the drive and idle side of the BOF vessel respectively. Two API analog panel meters 121, 123 also indicate this gap dimension but in analog fashion with a pointer and a marked scale. A rotational meter 124 provides digital readings of the angular orientation of a given shaft in relation to the BOF vessel vertical position.

The digital meters 120, 122, 124 each generate an output, 125, 126, 127 to a data selector and control board 128. The first vessel (designated vessel No. 1) drive position meter 120b, for example, has an output 125b coupled to the data selector and control board 128. The outputs to the data selector and control board are binary coded decimal digital signals indicative of both the shaft displacement (from meters 120, 122) and rotational orientation (from meter 124).

The data selector and control board 128 is coupled to a printer 130 used to generate a hard copy indication of rotational and transducer separation data. As will be discussed subsequently, actuation of the printer 130 is initiated by closure of a contact in one of the API analog meters 121a,b, 123a,b.

Figure 9:
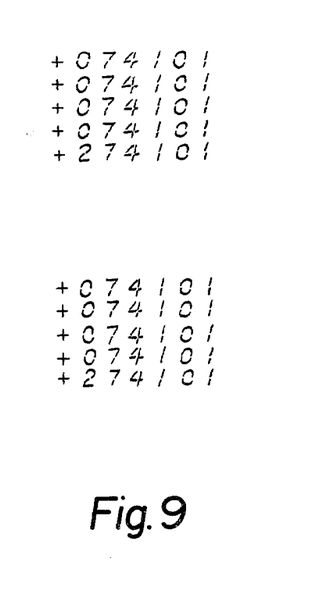
FIG. 9 shows a hard copy printout from a printer for displaying shaft to transducer position data of a bearing under scrutiny.

Turning now to FIG. 9 an ilustration of the printer output is shown. Six columns of data are included along with positive or negative sign. In the first row of printing, the first number is indicative of which BOF vessel has caused a warning to be initiated and therefore comprises either a 1 or a 2. The 3rd and 4th numbers are indicative of the drive side transducer to shaft distance of the BOF vessel shaft and the 5th and 6th numbers indicative of the idler side transducer to shaft distance. These numbers directly indicate shaft transducer spacing in thousandths of an inch. On subsequent rows after the 1st row of printing, the first two numbers indicate rotational orientation information in tens of degrees and in conjunction with the positive or negative sign provide information regarding the orientation of the BOF vessel. On these subsequent rows, the 3rd and subsequent numbers are again indicative of drive and idle side transducer to shaft distances.

Figure 10:
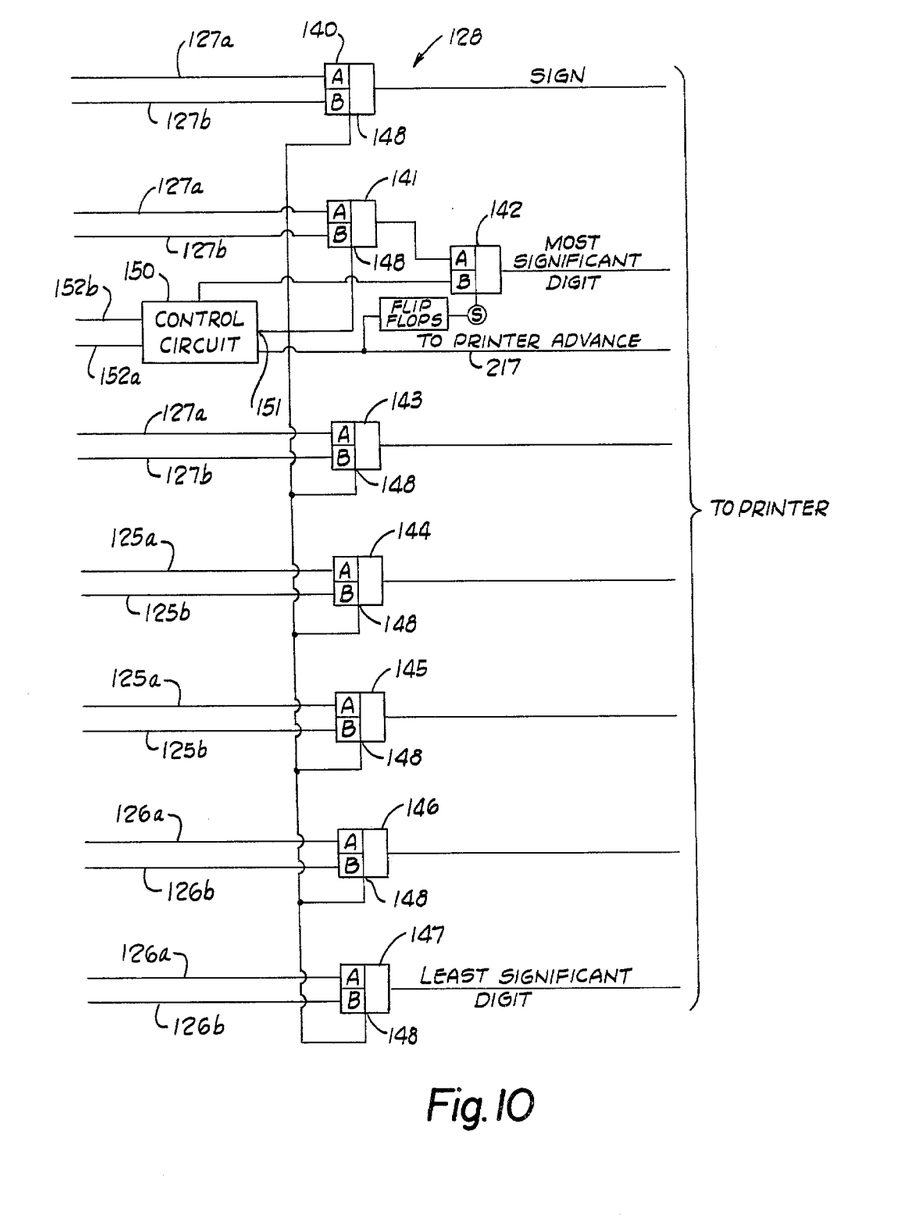
FIG. 10 depicts a block diagram of a data select and control circuit used in the preferred embodiment of the invention.

A functional block diagram of the data select and control circuit 128 is presented in FIG. 10. Data from the digital panel meters 120, 122, 124 is routed to a plurality of data selector integrated circuits 140-147 which generate 4 bit binary coded decimal outputs to the printer 130. The two sets of inputs on each integrated circuit have been labeled bank "A" and bank "B". With the exception of the data selector integrated circuit labeled with reference numeral 142 bank B data is data from the first BOF vessel and bank A data comprises data from the second BOF vessel. Each circuit 140-147 has an input 148 called a select input tied to a control circuit 150. The status of this input 148 determines whether each integrated circuit generates an output corresponding to bank A or bank B. A zero on this input 148 selects bank "A" and a "one" bank "B". All inputs 148 but the input to the integrated circuit labeled 142 are tied to one output 151 from the control unit. The input connected to integrated circuit 142 will be discussed in conjunction with FIG. 8. The control circuit 150 has two inputs 152a, 152b coupled to a relay logic board 154. Control signals along these inputs 152a,b causes the printer to print an output such as the one shown in FIG. 9.

Figure 7:
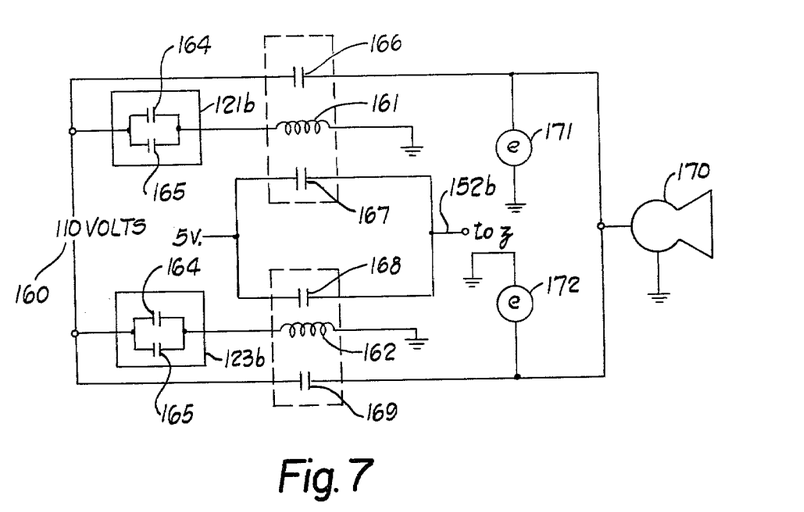
FIG. 7 shows a schematic of a portion of the system shown in FIG. 6.

Generation of control signals from the relay logic board 154 is shown in schematic fashion in FIG. 7. The logic board includes a 110 volt power supply 160 which provides power to energize two relay coils 161, 162. The relay logic for only one vessel has been illustrated in FIG. 7 but it should be appreciated that corresponding circuitry is used to generate input signals to the data selector control board from a second one of the two BOF vessels.

The coupling between the power supply 160 and the two relay coils 161, 162, comprises two normally open contacts 164, 165 in the API analog meters 121, 123. These two contacts close when the transducer to shaft distance deviates from an empirically determined limit. A first contact 164 closes whenever the shaft to transducer distance exceeds a predetermined range and the second of the two contacts 165 closes when the shaft to transducer distance is less than a predetermined value. It should be apparent to those skilled in the art therefore that the relay coil 161 will be energized whenever the drive side API meter indicates the drive side transducer has deviated from the empirically determined appropriate transducer to shaft distances. The relay coil 162 is energized when the shaft to transducer distance for the idle side transducers has deviated from an appropriate range.

Associated with a first relay coil 161 are two normally open contacts 166, 167 and associated with the second relay coil 162 are a second pair of normally open contacts 168, 169. Energization of either one of the relay coils 161, 162 causes its associated contacts to close providing a five volt output 152b indicating that vessel number 1 has a transducer to shaft range beyond the allowable range and also provides an audible signal from a horn 170 to warn the system operator. A visual indication is also provided by closure of the contact (166 or 169) coupling the voltage source to the horn 170. A first light 171 is illuminated when the drive side transducer to shaft distance has deviated beyond the preferred range and a second light 172 is illuminated when the idle side transducer to shaft distance has deviated from the preferred range. A latching circuit (not shown) insures that an energized relay coil remains energized and its associated contacts remain closed until a re-set switch is activated. Such latching circuits are known in the art.

Figure 8:
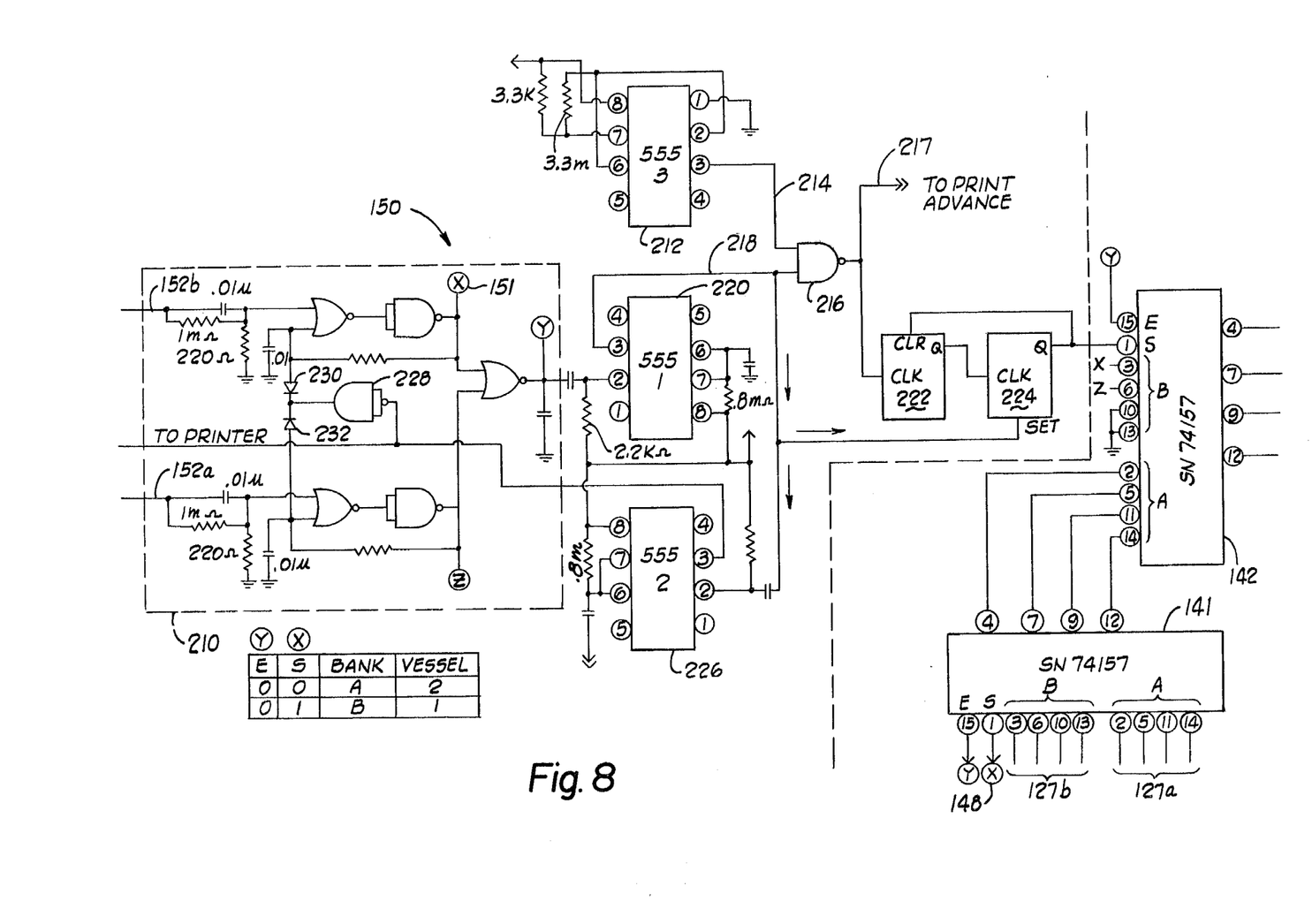
FIG. 8 shows a schematic of a second portion of the system shown in FIG. 6.

A portion of the data select and control board 128 is shown in more detail in FIG. 8. The portion includes the control circuit 150 shown coupled to the two connectors 152a, 152b from the relay logic board 154. The control circuit 150 comprises logic circuitry 210 which responds to the two input connections 152a, 152b. As noted above, a high input of 5 volts is transmitted from the relay logic board 154 on input 152b in response to movement of a first BOF vessel in relation to its bearing and the second input 152a generates such an input by movement of the second BOF vessel. During normal BOF vessel rotation these inputs have voltage values of approximately 0 volts.

The logic circuit 210 generates three outputs labeled X, Y and Z in FIG. 8. It will be appreciated by those skilled in the art that the input 152b from the first BOF vessel relay logic board controls the first output X. When this input 152b is 5 volts the output of X is also 5 volts. It should also be appreciated than when the second relay logic input 152a goes high the output labeled Z from the logic circuit 10 will also go high. Output signals X and Y are Nored together to produce output Y.

In addition to the logic circuit 210 the control circuit 150 comprises an oscillator 212 which generates an output 214 to a NAND gate 216. The NAND gate is coupled by an output 217 to the printer 130 and whenever oscillating signals from the oscillator 212 pass through the gate 216 the printer is actuated. The NAND gate 216 only transmits oscillations from the oscillator 212 when both its inputs are high. A second input 218 to the NAND gate originates from pin number 3 on a digital one shot 220. When the one shot 220 receives a low input on pin 2 from output Y of the logic circuitry the output from pin 3 goes high for a predetermined time period. So long as the output from the one shot 220 is high the oscillator 212 transmits clocking impulses to the printer.

The control circuit 150 is shown coupled to two of the 8 data selector integrated circuits 141, 142. Each integrated circuit has a number of pin connections which have been labeled in correspondence with the actual pin designations on the 74157 integrated circuit data selector used. It should be appreciated that although the outputs from the various data selectors shown in FIG. 10 comprise single conductors, each of those conductors is represented by 4 lines for transmitting binary coded data from a respective one of the data selector integrated circuits to the printer.

In the preferred embodiment the printer comprises a Gulton Model NP-7A Alpha Numeric printer which encodes the 4 binary coded data bits into a decimal output. As seen in FIG. 10 the printer receives 6 binary coded inputs conveying decimal data with the most significant decimal transmitted from the integrated circuit labeled with reference numeral 142. The printer 130 also receives a sign output from integrated circuit 140 and as mentioned above receives a printer advance signal from the control circuit 150.

Each of the integrated circuits includes 2 banks of data inputs as mentioned above. The input on pin No. 1 which has been labeled S in FIG. 8 dictates which of the 2 input banks is to be transmitted to a data selector output on pins 4, 7, 9 and 12. Each integrated circuit data selector also includes an enable input on pin 15. This input for each data selector is coupled to output Y from the logic circuit 210. A data selector integrated circuit is enabled and thereby generates output data only when its enable input on pin 15 is in a low state. As seen in the truth table at the lower left of FIG. 8 for inputs E and S on the data selector units a low input on input S couples bank A to a data selector output and a high input on input S couples input bank B to the data selector output pins. All integrated circuit data selector units have their enable input pin 15 connected to output Y on the logic circuit 210 and, except for unit 142, the selector pin No. 1 to the X output from the logic circuit 210. It should be appreciated to those skilled in the art once the enable input to the data selectors goes low, the output from that selector will be from bank B if input 152$b$ is high and will be from bank A if 152$b$ is low.

The operation of all data selectors with the exception of data selectors labeled with reference numerals 141 and 142 is straightforward. When the printer receives a printer advance signal from the NAND gate 216 the printer prints the data output from each data selector integrated circuit indicative of transducer separation and shaft orientation as indicated by the various panel meters coupled to the data selector integrated circuits.

The data selector unit 142 coupled to the most significant decimal output operates in a like manner on all printer outputs except the first. On this first data print, the output from this data selector unit 142 is indicative of which BOF vessel has a transducer to shaft distance either greater or less than optimum. This information is generated at input bank B on the data selector unit 142. Since pins 10 and 13 to this input bank are always grounded (see FIG. 8) it is only pins 3 and 6 on bank B which generate the output data when the selector pin (No. 1) is high. Since pin 3 is coupled to output X from the logic circuit 210 and pin 6 is coupled to output Z from that same logic circuit it should be appreciated to those skilled in the art that bank B comprises a binary coded 1 when output X is high and comprises a binary coded 2 when Z is high. Thus, when input 152$b$ is high bank B of the data selector 142 comprises a 1 in binary coded decimal format. Alternatively, when input 152$a$ is high bank B comprises a 2 in binary decimal coded format.

Input S to this data selector unit 142 is coupled to two flip-flop circuits 222, 224. The clocking input to the first of the two flip-flops 222 is coupled to the output from the NAND gate 216. When this clocking input to the first flip-flop receives a high output from the oscillator 212 input S on the data selector 142 goes high and the output from this data selector represents bank B inputs. On subsequent pulses transmitted through the NAND gate 216 the input S on the unit 142 is low and therefore the output from this unit 142 is indicative of the input on bank A. The input on bank A is merely the output from the data selector unit 141 which in turn corresponds to rotational orienation data from the meters 124$a$, 124$b$.

Timing and spacing operation of the printer is controlled by the one shot 220 discussed previously and a second one shot 226 shown in FIG. 8. The first one shot 220 dictates the time period during which the NAND gate transmits oscillator output signals to the printer during a particular printer activation. When the output from pin 3 on the first one shot 220 goes low the printer stops. As seen in FIG. 8 when this output 218 goes low it activates the second one shot 226 since the output 218 is coupled to input pin No. 2 on the second one shot. In response to this change in state in the first one shot the second one shot 226 generates a high output on pin 3 which is also coupled to the printer and activates a printer advance sequence. The printer advance mechanism causes the space between the series of outputs as shown in FIG. 9. This high voltage output from the second one shot is also coupled via a NAND gate 228 to 2 diodes 230, 232. These diodes are coupled to latching circuits inside the logic circuitry 210 and reset those latches so that subsequent 5 volt signals from the relay logic circuit inputs 152$b$, 152$a$ cause the printer to output data.

In the preferred embodiment of the invention the gap detection is accomplished using an Electro Corporation Model 4943 sensor, a Model PA-12D43 sensor preamplifier and output cabling with a designation 366P. The part numbers on FIG. 8 integrated circuits correspond to Texas Instrument Part Numbers for their 555 timer (one shot) and 74157 data selector.

While the present invention has been described with a degree of particularity, it should be appreciated that modifications and alterations may be made therein without departing from the spirit or scope of the invention set forth in the appended claims.

What is claimed is:

1. A system for monitoring wear of a trunnion bearing supporting a basic oxygen furnace vessel, said bearing including a housing and bearing structure for receiving a shaft, said system comprising:
    (a) a first transducer for producing a first output representing the distance between an idler side of said shaft and said first transducer;
    (b) a second transducer for producing an output representing the distance between the drive side of said shaft and said second transducer;
    (c) circuitry for monitoring said first and second transducer outputs and producing an alarm signal when the distance between the shaft and either transducer exceeds a predetermined value, and
    (d) a detector for indicating rotational orientation of the shaft with respect to a reference orientation; and
    (e) a data generator coupled to said circuitry for producing an indication of both the idler side and drive side shaft-to-transducer distances and of the angular orientation of said shaft.

2. The system of claim 1, further comprising: circuitry for transforming an analog output
    from each transducer to a respective digital output for transmission to the data generator.

3. A system for monitoring wear of a bearing structure carrying a shaft mounted therein, said system comprising:
    (a) first detector for producing an output representing shaft movement transverse to its axis;
    (b) a second detector for producing an output indicating the rotational orientation of said shaft with respect to a reference orientation, and
    (c) display circuitry coupled to said first and second detectors for producing a display indicating shaft movement magnitude and shaft rotational orientation.

4. Apparatus for monitoring the condition of a basic oxygen furnace vessel trunnion bearing which includes a shaft and bearing housing; said apparatus comprising:

(a) a first transducer for monitoring the distance between an idler side of said shaft and said first transducer and producing a first output;
(b) a second transducer for monitoring the distance between a drive side of said shaft and said second transducer and producing a second output;
(c) circuitry for monitoring said first and second transducer outputs and transmitting an alarm signal when the distance between the shaft and either transducer deviates from a preferred range;
(d) an encoder for indicating rotational orientation of the shaft and a visual data generator coupled to said circuitry for producing an indication of both the idler-side and drive-side shaft-to-transducer distances and of the angular orientation of said encoder when either distance deviates from the preferred range.

5. The apparatus of claim 4, further comprising: an analog-to-digital converter for transforming an analog output from each transducer to a digital output for transmittal to the visual data generator.

* * * * *

UNITED STATES PATENT AND TRADEMARK OFFICE
CERTIFICATE OF CORRECTION

PATENT NO. : 4,348,665
DATED : September 7, 1982
INVENTOR(S) : Heinz A. Rode et al It is certified that error appears in the above-identified patent and that said Letters Patent is hereby corrected as shown below:

Column 3, line 39, "failure" should be --feature--;
Column 3, line 41, "valve" should be --value--;
Column 4, line 66, "device" should be --drive--;
Column 8, line 29, "Y" should be --Z--.

Signed and Sealed this

Fifteenth Day of February 1983

[SEAL]

Attest:

GERALD J. MOSSINGHOFF

Attesting Officer     Commissioner of Patents and Trademarks